United States Patent
Lin et al.

(10) Patent No.: US 10,963,082 B2
(45) Date of Patent: *Mar. 30, 2021

(54) TOUCH PANELS INCLUDING TOUCH ELECTRODES CONNECTED BY METAL BRIDGES AND TOUCH DISPLAY DEVICES

(71) Applicant: KunShan Go-Visionox Opto-Electronics Co., Ltd., Kunshan (CN)

(72) Inventors: Shuai Lin, Kunshan (CN); Zhihua Zhang, Kunshan (CN); Xiangqian Wang, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,050

(22) Filed: Sep. 4, 2019

(65) Prior Publication Data

US 2019/0391694 A1    Dec. 26, 2019

Related U.S. Application Data

(63) Continuation of application No. PCT/CN2018/089147, filed on May 31, 2018.

(30) Foreign Application Priority Data

Nov. 30, 2017    (CN) .......................... 201721642833.3

(51) Int. Cl.
    *G06F 3/041*    (2006.01)
(52) U.S. Cl.
    CPC .. *G06F 3/0412* (2013.01); *G06F 2203/04111* (2013.01)

(58) Field of Classification Search
    None
    See application file for complete search history.

(56) References Cited

U.S. PATENT DOCUMENTS

| 10,001,893 B2* | 6/2018 | Ko ........................ G06F 3/0443 |
| 2014/0027264 A1* | 1/2014 | Chiu .................... H03K 17/962 |
| | | 200/600 |

(Continued)

FOREIGN PATENT DOCUMENTS

| CN | 104391610 A | 3/2015 |
| CN | 104636005 A * | 5/2015 |

(Continued)

OTHER PUBLICATIONS

International Search Report with English translation and Written Opinion of the International Searching Authority dated Aug. 7, 2018 in corresponding International Application No. PCT/CN2018/089147; 7 pages.

*Primary Examiner* — Kirk W Hermann
(74) *Attorney, Agent, or Firm* — Maier & Maier, PLLC

(57) ABSTRACT

Touch panels and touch display devices are provided. The touch panel includes a plurality of first touch electrode patterns, the first touch electrode patterns comprise a plurality of first touch units and a connection unit for connecting adjacent first touch units. A plurality of second touch electrode patterns are insulated from and intersected with the first touch electrode patterns. The second touch electrode pattern comprises a plurality of second touch units and at least one bridge unit for connecting adjacent second touch units. The bridge unit includes at least two metal bridges having a hollow-out pattern, and a connection portion connecting the at least two metal bridges.

12 Claims, 7 Drawing Sheets

(56) References Cited

U.S. PATENT DOCUMENTS

| | | | |
|---|---|---|---|
| 2014/0347319 A1* | 11/2014 | Lin | G06F 3/0445 345/174 |
| 2016/0109980 A1* | 4/2016 | Lee | G02F 1/13338 345/174 |
| 2018/0182821 A1* | 6/2018 | Yun | H01L 27/323 |

FOREIGN PATENT DOCUMENTS

| | | | | |
|---|---|---|---|---|
| CN | 104636005 A | | 5/2015 | |
| CN | 106293202 A | | 1/2017 | |
| CN | 106294202 A | * | 1/2017 | ........... G06F 3/0688 |
| JP | 2014153791 A | * | 8/2014 | |
| KR | 20130072402 A | | 7/2013 | |

* cited by examiner

TOUCH PANELS INCLUDING TOUCH ELECTRODES CONNECTED BY METAL BRIDGES AND TOUCH DISPLAY DEVICES

CROSS REFERENCE

The application claims the priority of Chinese Patent Application No. 201721642833.3 filed on Nov. 30, 2017, entitled "TOUCH PANELS AND TOUCH DISPLAY DEVICES", the entire contents of which are incorporated in the application by reference herein in their entirety.

FIELD

The application relates to the field of touch technology.

BACKGROUND

In the prior art, a touch panel, as an input device, is generally applied for an electronic terminal such as a mobile phone, a tablet computer, and a touch panel, and for receiving from a user touch operation instructions such as clicking and sliding on the touch panel.

SUMMARY

Exemplary embodiments of the application provide touch panels and touch display devices, which aim to improve the problem of touch failure due to a breakage of a metal bridge in a touch panel during use.

Exemplary embodiments of the application provide the following technical solutions.

A touch panel including:
a plurality of first touch electrode patterns arranged along a first direction, the first touch electrode pattern including a plurality of first touch units and a plurality of connection units each connecting two adjacent first touch units;
a plurality of second touch electrode patterns arranged along a second direction and insulated from and intersected with the first touch electrode patterns, the second touch electrode pattern including a plurality of independent second touch units and at least one bridge unit connecting two adjacent second touch units, the bridge unit including at least two metal bridges respectively having a hollow-out pattern, and
a connection portion connecting the at least two metal bridges.

Preferably, at least two bridge units are arranged in parallel between the two adjacent second touch units.

Preferably, the first touch electrode pattern is provided with a hollow-out region, the connection portion is insulated from and embedded in the hollow-out region.

Preferably, the connection portion is insulated from the first touch electrode pattern, and the connection portion overlaps with the first touch electrode pattern at an overlapping position.

Preferably, the two adjacent second touch units corresponding to one of the bridge units respectively have a second concave-convex structure formed at a spaced channel between the two adjacent second touch units, and the metal bridges connect the connection portion with the two adjacent second touch units via a shortest distance.

Preferably, the connection unit of the first touch electrode pattern has a first concave-convex structure matching with the second concave-convex structure of the second touch electrode pattern.

Preferably, the hollow-out pattern of the at least one bridge unit extends along the second direction.

Preferably, the at least one bridge unit is arranged along a preset direction, and an angle between the preset direction and the second direction is greater than 0° and less than 90°.

A touch display device including the touch panel according to any one of the touch panels.

The following beneficial effects can be achieved by at least one technical solution adopted by the exemplary embodiments of the application:

In the technical solutions provided by the application, a hollow pattern is arranged on a bridge unit, and at least two channels for touch signal transmission are formed in the bridge unit. When one of the channels for touch signal transmission is broken, the other channels for touch signal transmission can still perform signal transmission, thereby alleviating the problem of touch failure after the breakage of the bridge unit in the touch panel, improving the durability of the entire touch panel and prolonging the service life. Moreover, two adjacent second touch units in the solution are connected through the metal bridge and the connecting portion, which can effectively shorten the length of the metal bridge between the two second touch units, thereby alleviating a light reflection phenomenon caused by the metal bridge.

DETAILED DESCRIPTION

Figure 1A:
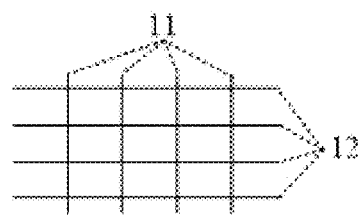
FIG. 1a is a schematic structural view of a touch panel in the prior art.
Figure 1B:
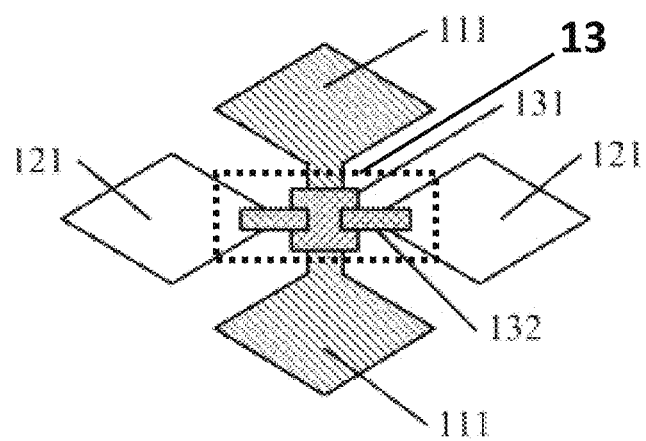
FIG. 1b is an enlarged structural view of a touch panel in the prior art.

An existing touch panel often includes a first direction electrode 11 and a second direction electrode 12, and the first direction is perpendicular to the second direction. As shown in FIG. 1a, two adjacent electrode blocks in the first direction are connected to each other by a metal bridge unit passing through a bridge portion 131 on the second direction electrode 12. An enlarged view of a specific structure is shown in FIG. 1b. The first direction electrode and the second direction electrode are often block electrodes, and block electrodes 111 in the first direction electrode are arranged to be connected to each other, and block electrodes 121 in the second direction electrode are arranged to be spaced apart from each other. Also, a bridge unit 13 is generally arranged between the adjacent block electrodes 121 in the second direction electrode, and the bridge unit 13 includes a bridge portion 131 and a metal bridge 132, to enable the first direction electrode 11 and the second direction electrode 12 are mutually insulated and each conductive.

In the existing touch panel, the adjacent block electrodes are connected only by the bridge unit. Since the metal bridge in the bridge unit is comparatively thin, the metal bridge is prone to breaking during use, which causes a broken circuit between the adjacent block electrodes, thereby resulting in poor overall touch performance of the touch screen, and even touch failure.

The technical solutions of the application will be clearly and completely described below in conjunction with the specific exemplary embodiments of the application and the corresponding drawings.

Exemplary Embodiment 1

Figure 2A:
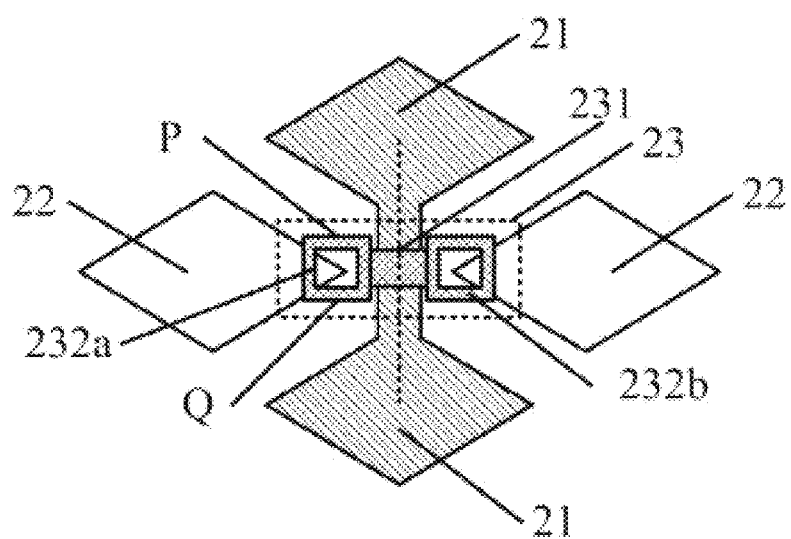
FIG. 2a is a first schematic structural view of a touch panel provided by the application.

An exemplary embodiment provides a touch panel as shown in FIG. 2a. The touch panel includes:
A plurality of first touch electrode patterns arranged along a first direction. The first touch electrode pattern includes a plurality of first touch units 21 and a connection unit for connecting two adjacent first touch units 21.
A plurality of second touch electrode patterns arranged along a second direction and insulated from and intersected with the first touch electrode patterns. The second touch electrode pattern includes a plurality of independent second touch units 22 and at least one bridge unit 23 for connecting two adjacent second touch units 22. Wherein the bridge unit 23 includes: at least two metal bridges 232a, 232b having a hollow-out pattern, and a connection portion 231 connecting the at least two metal bridges.

During the use of the display screen having the above touch panel, the bridge unit is possibly broken, resulting in poor touch performance or even touch failure. For the touch panel structure provided in the exemplary embodiment, the bridge unit 23 includes a connection portion 231 and at least two metal bridges 232. A left metal bridge 232a and a right metal bridge 232b are connected to two sides of the connection portion 231 of FIG. 2a. Since the metal bridges 232a, 232b each have a hollow-out pattern, the left metal bridge 232a can be divided into an upper channel P for transmitting touch signals and lower channel Q for transmitting the touch signals. When a touch operation is performed on the touch panel by a user, the upper channel P for transmitting the touch signals may be broken, and the electrical signal cannot be continuously transmitted through the upper channel P for transmitting the touch signal. Since the metal bridge 232a has a hollow-out pattern, the electrical signal can be still transmitted through the lower channel Q for transmitting the touch signal, and the overall touch performance of the touch panel is not significantly affected. The structure of metal bridge 232b at the right side and the structure of metal bridge 232a at the left side are the same, and the functions thereof are similar, and will not be described again here.

As can be seen, in the technical solution provided by the exemplary embodiment of the application, the metal bridges 232a, 232b are each provided with a hollow-out pattern, and at least two channels for touch signal transmission are formed in each metal bridge. When the channels at a side for touch signal transmission is broken, electric signal may still be transmitted through the other channels for touch signal transmission, thereby alleviating the problem of touch failure after the breakage of the metal bridge in the touch panel and improving the durability of the touch panel. In addition, since the bridge unit 23 in the touch panel is often made of a metal material, metal reflection may occur on the touch panel. In the structure of the application, the two adjacent second touch units 22 are connected to each other through the connection portion 231, which obviously reduces the area of the metal bridge unit 23 on the touch panel, thereby alleviating the metal reflection on the touch panel.

Exemplary Embodiment 2

Figure 2B:
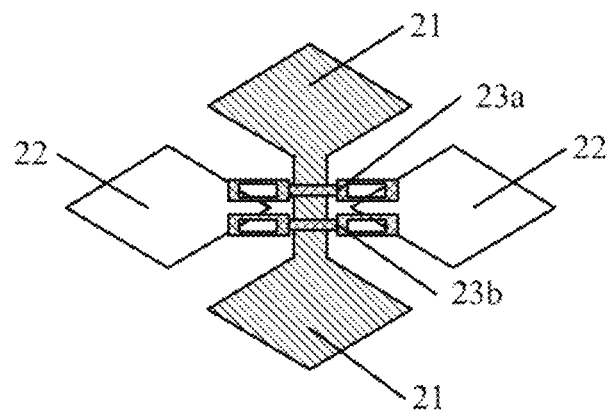
FIG. 2b is a second schematic structural view of a touch panel provided by the application.

Based on the above exemplary embodiment, the solution further provides a touch panel structure. At least two bridge units 23 are arranged in parallel between two adjacent second touch units 22. With reference to FIG. 2b, with the above structure, when one of the bridge units 23a breaks at a plurality of locations and each channel for touch signal transmission is unable to perform electrical signal transmission due to its breakage, the other bridge unit 23b may still perform electrical signal transmission between the two adjacent touch units. As can be seen, the parallel arrangement of at least two bridge units between the two adjacent second touch units 22 may further improve the durability of the touch panel and the touch signal transmission can be normally performed after the metal bridges in the touch panel are broken.

In addition, when a user performs a touch operation, it is also possible to discharge static electricity to the touch panel through a fingertip, so that the metal bridge in the bridge unit 23 is damaged by static electricity. In the solution, an influence of static electricity on the touch performance may be reduced to some extent by the plurality of bridge units 23 arranged between the two adjacent second touch units 22. Moreover, in the application, the metal bridge has a hollow-out structure, so that the metal bridge has a plurality of channels for touch signal transmission. When the metal bridge is damaged by static electricity, only some transmission channels in the metal bridge may be damaged, and the remaining transmission channels may still perform touch signal transmission. Therefore, the influence of electrostatic damage on the touch performance may be reduced by the structure of the application and the durability of the touch panel may be improved.

Based on the above exemplary embodiments, the connection portion 231 of the touch panel provided by the solution can be specifically divided into two structures:

Structure 1: The connection portion 231 is insulatively embedded in the hollow-out region of the first touch electrode pattern.

Figure 2C:
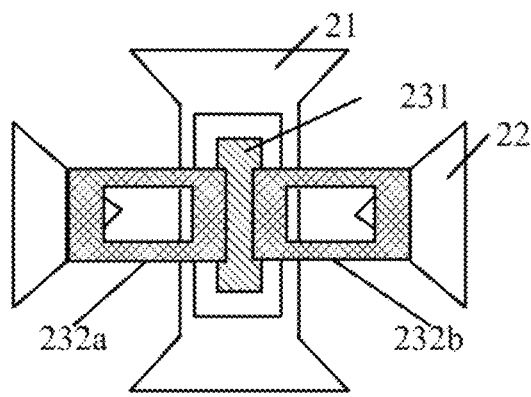
FIG. 2c is an enlarged structural view of a connection portion of a touch panel provided by the application.

FIG. 2c is an enlarged view of the connection portion 231 based on FIG. 2a. In the figure, the first touch electrode pattern has a hollow-out region, and a connection portion 231 is arranged in the hollow-out region, which is shown by hatching in the drawing. In the figure, the metal bridges 232a, 232b each have a hollow-out pattern, and the two metal bridges 232a, 232b connect two adjacent second touch units through the connection portion 231. In this configuration, the two adjacent second touch units 22 are connected to each other through the connection portion 231, and the connection portion 231 may shorten the length of the metal bridge in the bridge unit and relieve the metal reflection caused by the excessive length of the metal bridge, under the premise of the connection portion 231 ensuring the normal transmission of the touch signals.

Structure 2: The connection portion 231 is insulated from and overlaps with the first touch electrode pattern.

Figure 2D:
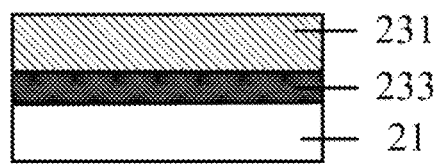
FIG. 2d is a partial cross-sectional view of a touch panel provided by the application.

Based on FIG. 2a, FIG. 2d is a cross-sectional view taken along the broken line. In the overlapping position, an insulated layer 233 is interposed between the connection portion 231 and the first touch electrode pattern, and the insulated layer 233 can ensure that the first touch electrode pattern and the second touch electrode pattern are insulated from each other to avoid short circuit or signal crosstalk. In addition, the structure can shorten the length of the metal bridge in the bridge unit and alleviate the reflection phenomenon caused by the excessive length of the metal bridge.

Figure 3A:
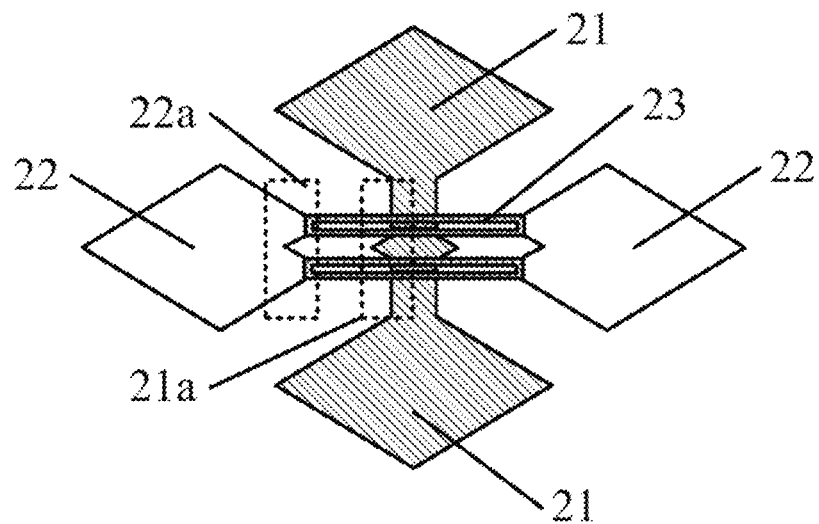
FIG. 3a is a schematic structural view of a touch panel including a triangular concave-convex structure provided by the application.

Based on the structure provided by the above exemplary embodiment, the solution further provides a touch panel. With reference to FIG. 3a, the two adjacent second touch units 22 corresponding to any one of the bridge units 23 each have a concave-convex structure 22a at a spaced channel, and the two second touch units 22 are connected by the bridge units 23 via a shortest distance.

In FIG. 3a, the concave-convex structure of the second touch unit 22 is triangular, as specifically shown in the curved box indicated by 22a in FIG. 3a. Similarly, the concave-convex structure may also be rectangular, as shown by the dashed frame indicated by 22a in FIG. 3b. In addition, the concave-convex structure may be other shapes such as a trapezoid, a semicircle, and the like. In the above structure, since the second touch unit 22 has the concave-convex structure and the bridge units are connected between the two adjacent second touch units 22 via the shortest distance, the length of the bridge unit 23 is relatively short. Since the metal bridge in the bridge unit is often made of metal material, and the touch panel is often overlapped with the display panel in the electronic device, shortening the length of the bridge unit 23 in the solution may avoid light reflection of metals present on the touch panel as much as possible, thereby avoiding the influence on the display performance. In addition, a shorter metal bridge is less prone to breaking than a longer metal bridge. Therefore, shortening the length of the metal bridge may further improve the durability of the entire touch panel. Especially for a flexible touch panel, the shorter metal bridge may further improve the ability to resist bending of the touch panel.

Based on the structure provided by the above exemplary embodiment, the solution further provides a touch panel. With reference to FIG. 3a, the connection unit of the first touch electrode pattern has a concave-convex structure 21a matching with a concave-convex structure 22a of the second touch electrode pattern.

Figure 3B:
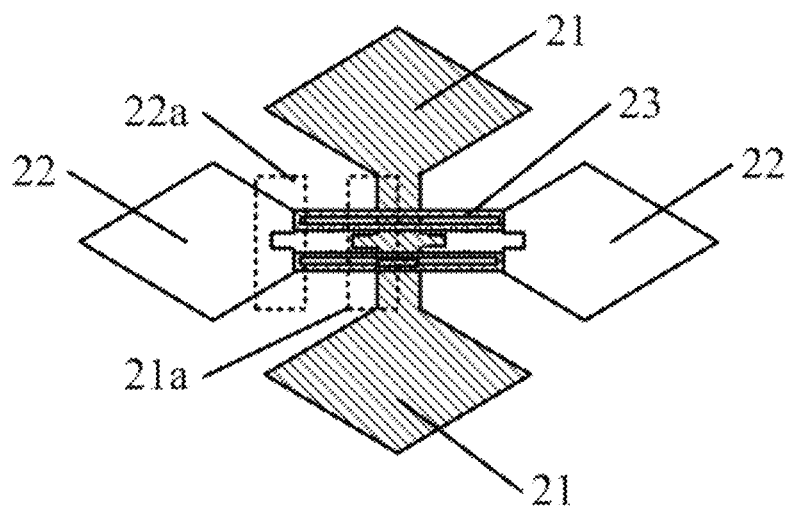
FIG. 3b is a schematic structural view of a touch panel including a rectangular concave-convex structure provided by the application.

The connection unit in the first touch electrode pattern in FIG. 3a and FIG. 3b is used to perform communicate touch signal between the two adjacent second touch units 22. When the second touch electrode pattern has a concave-convex structure 22a, in order to ensure communication of the touch signal between the two adjacent second touch units 22 and avoid too narrow width for touch signal transmission, the connection unit of the first touch electrode pattern in the solution has a shape matching with the concave-convex structure of the second touch unit, thereby effectively avoiding too narrow channel for touch signal transmission, reducing the overall resistance of the touch panel, and improving the touch sensitivity of the entire touch panel.

Based on the above exemplary embodiment, the solution further provides a touch panel, and the extending direction of the hollow-out pattern of the at least one bridge unit 23 is arranged along the second direction.

Figure 4:
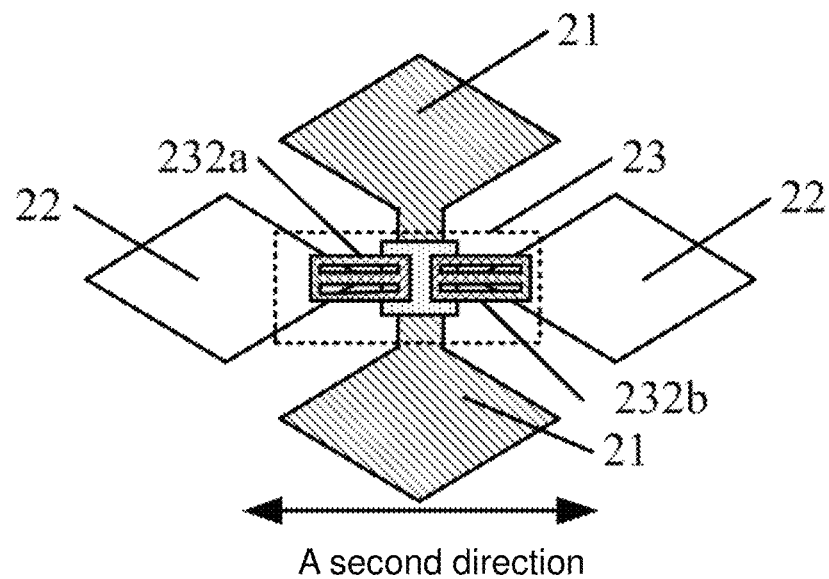
FIG. 4 is a third schematic structural view of a touch panel provided by the application.

The structural schematic view is shown in FIG. 4 and includes the first touch unit 21, the second touch unit 22 and the bridge unit 23 arranged between the adjacent two second touch units. The bridge unit 23 specifically includes a connection portion 231 and metal bridges 232a, 232b lapped on the left and right sides of the connection portion 231, wherein the metal bridges 232a, 232b specifically has the hollow-out pattern. Taking metal bridge 232a at the left side as an example, the hollow-out pattern of the metal bridge 232a may be two rectangular patterns. The two rectangular patterns arranged perpendicularly to the second direction are arranged on one metal bridge 232a of the bridge unit 23. The two rectangular patterns arranged perpendicularly to the second direction on the metal bridge 232a divide the metal bridge 23 into upper, middle and lower transmission lines. The metal bridge 23 may be broken when the user performs the touch operation. If a first channel for touch signal transmission located above is broken, two channels for touch signal transmission located in the middle and below may still perform electrical signal transmission between the electrode blocks. Similarly, the metal bridge 232b located at the right side of the connection portion 231 has the same structure as the metal bridge 232a at the left side, and the functions thereof are the same, and will not be described herein. Therefore, the metal bridge 23 provided in the solution after broken to some extent, may still ensure electrical signal transmission on the touch panel, thereby improving the durability of the touch panel and alleviating the touch failure after the breakage of the metal bridge of the touch panel.

Figure 5:
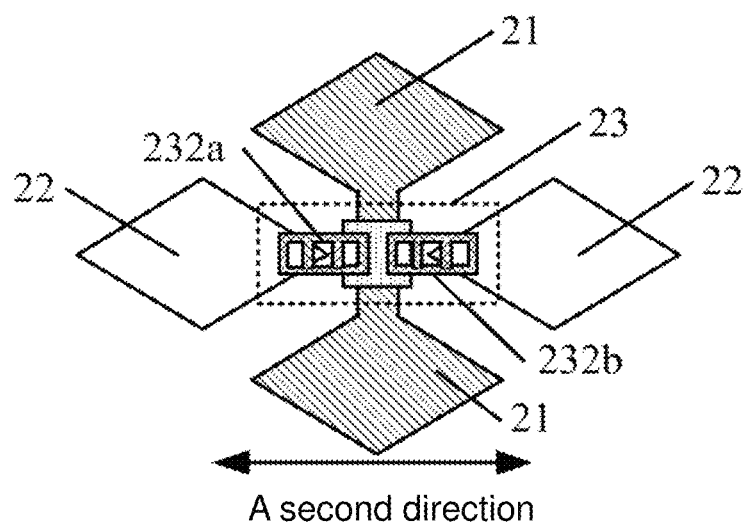
FIG. 5 is a fourth schematic structural view of a touch panel provided by the application.

Based on the touch panel provided by the above exemplary embodiment, with reference to FIG. 5, the bridge unit 23 of the touch panel specifically includes a connection portion 231 and metal bridges 232a and 232b lapped on the left and right sides of the connection portion 231. The hollow-out patterns of the metal bridges 232a, 232b may be arranged along the second direction. In the bridge unit 23 shown in FIG. 5, the electrical signal can be transmitted along a plurality of routes. When any one of the bridge units 23 is broken, the bridge unit 23 can still ensure the normal signal transmission between the two adjacent second electrode units 22. It can be seen that the bridge unit 23 shown in FIG. 5 can improve the problem of touch failure after the breakage of the metal bridge in the touch panel.

Figure 6:
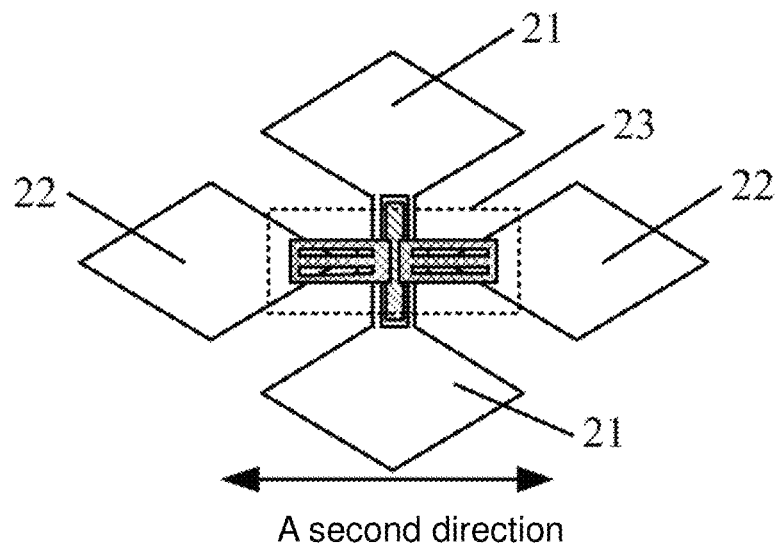
FIG. 6 is a fifth schematic structural view of a touch panel provided by the application.
Figure 7:
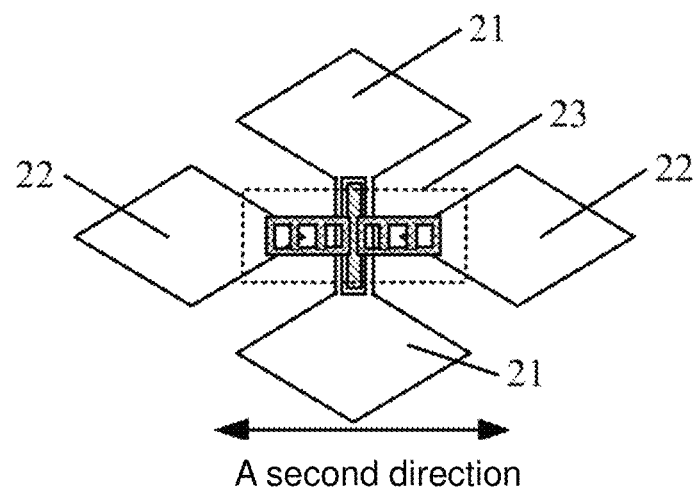
FIG. 7 is a sixth schematic structural view of a touch panel provided by the application.

In addition, when the connection portion 231 is insulated from and embedded in the hollow-out region of the first touch electrode pattern, the structure of the touch panel is as shown in FIG. 6 and FIG. 7. In FIG. 6, the extending direction of the hollow pattern is arranged along the second direction, and in FIG. 7, the extending direction of the hollow pattern is perpendicular to the second direction. The structure of the touch panel shown in FIG. 6 and FIG. 7 has a connection portion 231, compared with the structure of the metal bridges that are directly lapped between the two adjacent second touch units 22, the shorter length of the metal wire between the two second touch units 22 can not only improve the problem of touch failure after the breakage of the metal bridge in the touch panel, but also reduce the light reflection defect of the metal wire on the touch panel.

Figure 8:
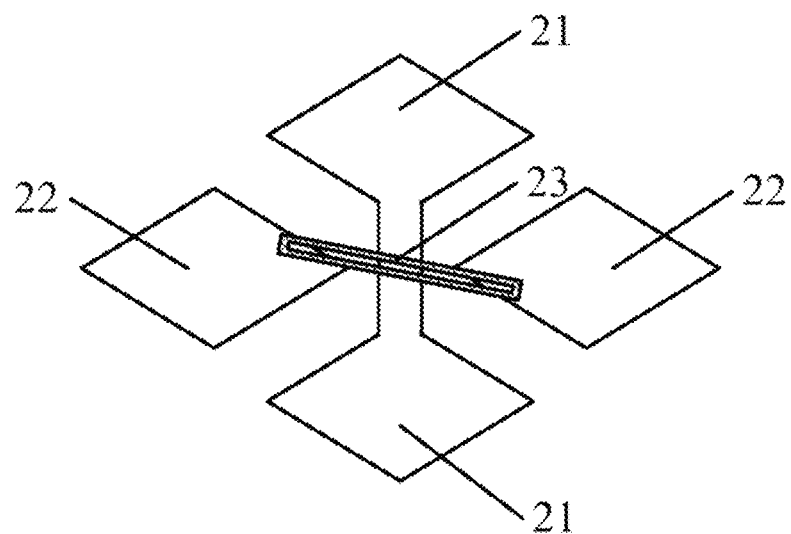
FIG. 8 is a seventh schematic structural view of a touch panel provided by the application.

Based on the above exemplary embodiments, the solution provides a touch panel, wherein the at least one bridge unit 23 is obliquely arranged along a preset direction, wherein an angle between the preset direction and the second direction is greater than 0° and less than 90°. Its structure is shown in FIG. 8. In the actual application process, for some flexible touch panels, it will be bent under the action of external force. When bending, the metal bridge is subjected to bending stress. Since the metal bridge is thin, a bending line is short when bending, thus the metal bridge is easy to break and the contact between the two adjacent second touch units is poor, thereby causing touch failure. The touch panel structure provided by the solution can disperse the stress in the region in which the metal bridge is located, prolong the length of the bending position of the metal wire during bending, extend the bending line, and release the stress uniformly, thereby avoiding the concentration of the bending stress only on the bending line. Thus the problem of metal wire breakage caused by bending or touch operation can be alleviated, thereby ensuring the touch performance of the touch panel and prolonging the service life.

In addition, each bridge unit 23 of the solution has a grid structure. When touch signal is transmitted through a bridge unit 23 having a grid shape, there are various transmission channels for the touch signal, and the touch signal may be transmitted along any one of the transmission channels. When the bridge unit 23 having the grid shape presents breakage, the grids surrounding the broken position may still transfer signal continuously. Therefore, the durability of the touch panel can be enhanced by the structure provided by the application, improving the problem of touch failure due to the breakage of the metal bridge in the touch panel.

Figure 9:
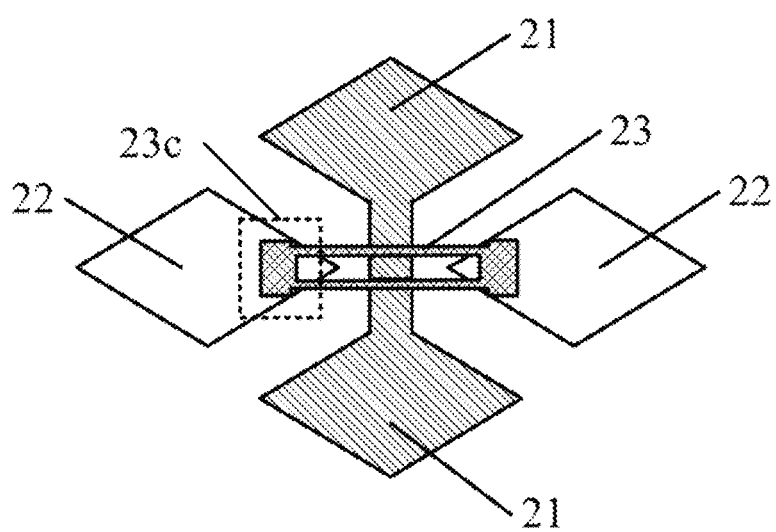
FIG. 9 is an eighth schematic structural view of a touch panel provided by the application.
Figure 10A:
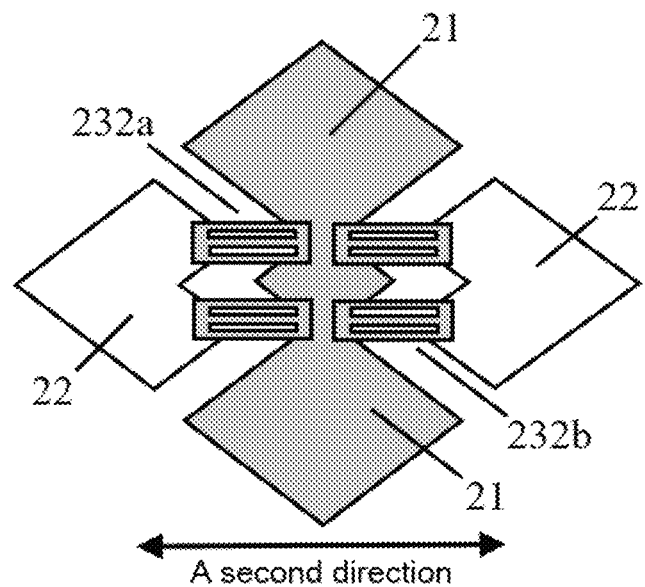
FIG. 10a is a schematic structural view of a touch panel including a triangular concave-convex structure provided by the application.
Figure 10B:
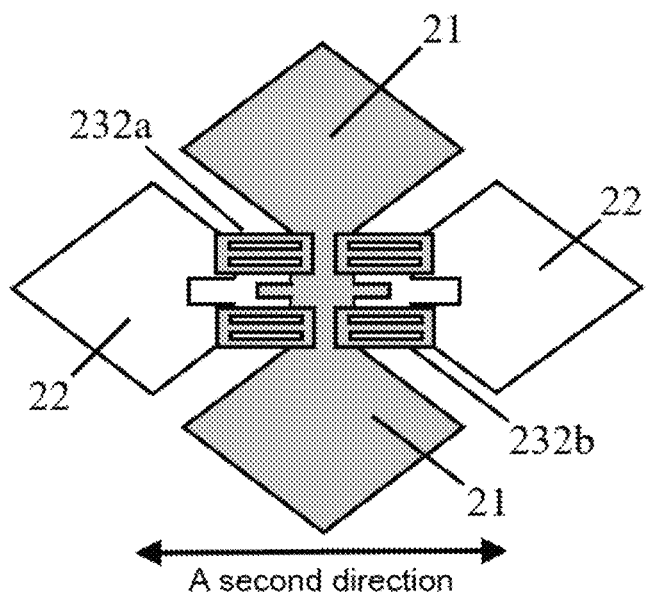
FIG. 10b is a schematic structural view of a touch panel including a rectangular concave-convex structure provided by the application.

For the above bridge unit 23, the bridge unit 23 further includes a contact portion 23*c* located at either end of the bridge unit 23 for contacting and connecting the second touch unit 22, and a width of the contact portion 23*c* along a direction perpendicular to an extending direction of the bridge unit 23 is greater than a width of other portions of the bridge unit. As shown in FIG. 9, with this structure, a contact face between the bridge unit 23 and the electrode block is relatively larger. Contact resistance between the bridge unit 23 and the second touch unit 22 may be effectively reduced by the larger contact area due to the contact resistance being inversely proportional to the contact area. In the second touch electrode pattern of the touch panel, if the contact face between each bridge unit 23 and the second touch unit 22 has the structure of the exemplary embodiment, the overall resistance of the second touch electrode patterns can be effectively reduced and the overall sensitivity of the touch panel can be increased.

Exemplary Embodiment 3

A touch display device includes any one of the touch panels involved in the above exemplary embodiments. The touch display device may be applied to an electronic device having the function of touch display. The touch display device provided by the exemplary embodiment may reduce the problem of touch failure due to the breakage of the bridge unit in the touch panel, improve the durability of the entire touch display device, alleviate the problem of touch failure due to the breakage of the bridge unit in the touch panel, and prolong the service life of the device.

In addition, the display device may be any product or component having the display function, such as a mobile phone, a tablet computer, a television, a display, a notebook computer, a digital photo frame, a navigator, and a smart wearable device. It should be understood by a person skilled in the art that there may be other indispensable components of the display device, which are not described herein, nor should be construed as limited to the application.

What is claimed is:
1. A touch panel comprising:
a plurality of first touch electrode patterns arranged along a first direction, the first touch electrode pattern comprising a plurality of first touch units and a plurality of connection units each connecting two adjacent first touch units; and
a plurality of second touch electrode patterns arranged along a second direction and insulated from and intersected with the first touch electrode patterns, the second touch electrode pattern comprising a plurality of independent second touch units and at least one bridge unit connecting two adjacent second touch units, the bridge unit comprising at least two metal bridges respectively having a hollow-out pattern, and a connection portion connecting the at least two metal bridges,
wherein the hollow-out pattern of the at least one bridge unit comprises at least two hollow-out patterns, the at least two hollow-out patterns are arranged along an arranging direction perpendicularly to the second direction,
wherein at least two bridge units are arranged in parallel between the two adjacent second touch units,
wherein the two adjacent second touch units corresponding to one of the bridge units respectively have a second concave-convex structure formed at a spaced channel between the two adjacent second touch units, and the metal bridges connect the connection portion with the two adjacent second touch units via a shortest distance,
wherein two adjacent second touch units have the second concave-convex structure forming at least one notch portion on the two adjacent second touch units,
wherein the connection unit of the first touch unit pattern has a first concave-convex structure having a shape that matches a shape of a space within the at least one notch portion of the second concave-convex structure on the second touch electrode pattern.
2. The touch panel according to claim 1, wherein the first touch electrode pattern is provided with a hollow-out region, the connection portion is insulated from and embedded in the hollow-out region.
3. The touch panel according to claim 1, wherein the connection portion is insulated from the first touch electrode pattern, and the connection portion overlaps with the first touch electrode pattern at an overlapping position.
4. The touch panel according to claim 3, wherein the connection portion and the first touch electrode pattern have an insulated layer provided therebetween at the overlapping position.
5. The touch panel according to claim 1, wherein the second concave-convex structure is a triangle, or a rectangle, or a trapezoid, or a semicircle.
6. The touch panel according to claim 1, wherein the connection unit of the first touch electrode pattern has a first concave-convex structure matching with the second concave-convex structure of the second touch electrode pattern.
7. The touch panel according to claim 1, wherein the hollow-out pattern of the at least one bridge unit extends along the second direction.
8. The touch panel according to claim 1, wherein the at least two hollow-out patterns are rectangular patterns.

9. The touch panel according to claim 1, wherein the at least two hollow-out patterns are further arranged along the second direction.

10. The touch panel according to claim 1, wherein the bridge unit further comprises two contact portions located at opposite ends of the bridge unit connecting the second touch unit, and a width of the contact portion along a direction perpendicular to an extending direction of the bridge unit is greater than a width of the connection portion, and a width of the metal bridge of the bridge unit.

11. The touch panel according to claim 1, wherein the at least one bridge unit is arranged along a preset direction, and an angle between the preset direction and the second direction is greater than Wand less than 90°.

12. A touch display device comprising the touch panel according to claim 1.

* * * * *